(12) United States Patent
Shih et al.

(10) Patent No.: US 7,718,713 B2
(45) Date of Patent: May 18, 2010

(54) METHOD OF MANUFACTURING THE SUPER-ABSORBENT POLYMER (SAP) WHICH IS POWDERY, INSOLUBLE IN WATER, AND ABLE TO ABSORB WATER, BLOOD AND URINE AND HAS SLIGHT SOLUBLE THINGS

(75) Inventors: Kai Yao Shih, Tainan (TW); Cheng Chang Wu, Kaohsiung (TW); Yung Chung Li, Taichung County (TW)

(73) Assignee: Formosa Plastics Corporation, Taipei (TW)

( * ) Notice: Subject to any disclaimer, the term of this patent is extended or adjusted under 35 U.S.C. 154(b) by 200 days.

(21) Appl. No.: 11/540,659

(22) Filed: Oct. 2, 2006

(65) Prior Publication Data
US 2008/0081848 A1    Apr. 3, 2008

(51) Int. Cl.
*C08F 283/10* (2006.01)
*B01J 20/22* (2006.01)

(52) U.S. Cl. ............................ 522/92; 502/402; 522/24; 522/27; 522/96; 522/100

(58) Field of Classification Search .................. 522/24, 522/27, 92, 96, 100; 502/402
See application file for complete search history.

(56) References Cited

U.S. PATENT DOCUMENTS

| | | | | |
|---|---|---|---|---|
| 5,492,962 A | * | 2/1996 | Lahrman et al. | 524/556 |
| 2005/0245684 A1 | * | 11/2005 | Daniel et al. | 525/178 |
| 2006/0089611 A1 | * | 4/2006 | Herfert et al. | 604/367 |

* cited by examiner

*Primary Examiner*—Mark Eashoo
*Assistant Examiner*—Jessica Paul
(74) *Attorney, Agent, or Firm*—Ming Chow; Sinorica, LLC

(57) ABSTRACT

A method of manufacturing super-absorbent polymer (SAP) which is powdery, insoluble in water, and able to absorb water, blood and urine with slight soluble substances. The method includes at least the following steps: mixing a monomer solution having at least 50 mol % of neutralized acrylic acid with polymerization initiators to synthesize a sticky precursor, wherein the monomer can be selected from acrylic acid, methacrylic acid, 2-acrylamido-2-methyl-propane sulfonic acid, or the mixtures thereof; mixing high hydrophilic epoxy compounds and polymerization initiators with the precursor and producing a gel via UV cross-linking; drying the gel at temperature of 100 to 250° C. to obtain a polymer; grinding and screening the polymer into constant particle size; coating the polymer with surface cross-linking agents; heating the polymer at temperature of 80 to 230° C.; and adding powdery inert inorganic salts into the polymer.

9 Claims, No Drawings

METHOD OF MANUFACTURING THE SUPER-ABSORBENT POLYMER (SAP) WHICH IS POWDERY, INSOLUBLE IN WATER, AND ABLE TO ABSORB WATER, BLOOD AND URINE AND HAS SLIGHT SOLUBLE THINGS

BACKGROUND OF THE INVENTION

1. Field of the Invention

The present invention relates to a method of manufacturing super-absorbent polymer (SAP), particularly a method of manufacturing super-absorbent polymer (SAP) which is powdery, insoluble in water, and able to absorb water, blood and urine with slight soluble substances.

2. Description of the Related Prior Art

Super-absorbent polymer (SAP) is of great water holding capacity, which is able to absorb water of hundred- and even thousand-fold of its weight, and is swelled after absorption so that water is kept in immobile state and from leaking out, even under pressure; by the way, the absorbed water is released to atmosphere slowly. Due to having the above-mentioned characteristics, SAP was used as water holding agent for soil in forest and agriculturally at early date. Recently, it is widely used in sanitary products, such as diapers, adult incontinence products, and feminine sanitary products as absorbent, and in applications for preserving foods, owing to the progressing of method of manufacturing SAP.

The constituent materials of SAP comprise hydrolyzed starch-acrylonitrile grafted polymers (JP-Kokoku-49(1974)-43,395);neutralized starch-acrylic acid grafted polymers (JP-Kokoku-51(1976)-125,468); saponified propenyl vinylacetate co-polymers (JP-Kokoku-52(1977)-14,689); hydrolyzed acrylonitrile polymers or acrylamide co-polymers (JP-Kokoku-53(1978)-15,959); partially neutralized polyacrylic acids (JP-Kokoku-55(1980)-84,304), etc. Among them, the SAP obtained by the cross-linking reactions between acrylic acids and acrylates are most common and economical, because acrylic acids are readily commercial available, the manufactured SAP are of excellent absorption ability, and the manufacturing processes are low cost with economical benefits.

The absorbent polymer is an insoluble hydrophilic polymer. Generally, polymer is of homogeneous bridging structure internally. A further bridging is conducted on surface of polymer after screening for given particle diameter in order to improve the properties, for example, to increase absorption rate, gel strength, blocking resistance, and liquid permeability. Such surface cross-linking is conducted by means of multifunctional cross-linking agents capable of reacting with acidic groups, as disclosed in many patent literatures, for example, the surface cross-linking is done with the dispersive absorbent polymers and the cross-linking agents conducted in organic solvent (JP-Kokoku-56(1981)-131608, JP-Kokoku-57(1982)-44627, JP-Kokoku-58(1983)-42602, and JP-Laid-open-58(1983)-117222); treating with mixing cross-linking agents and cross-linking agent solutions in the form of inorganic powders into SAP (JP-Kokoku-60(1985)-163956, JP-Kokoku-60(1985)-255814); treating with vaporization after addition of cross-linking agents (JP-A-1(1989)-113406); surface cross-linking with organic solvent, water and polyatomic alcohol (JP-Kokoku-63(1988)-270741, JP-Kokoku-64(1989)-50707, JP-Kokoku-1(1989)-292004); processing with solvent, water and ether (JP-Laid-open-2-153903), and the like. Though these processes increase the absorption rate of polymer (resin) or the magnification of absorbing water under pressure, yet they tend to excessively decrease holding capacity and consequently lower the performance on practical uses.

Methods of manufacturing SAP with polyacrylic acids and acrylates have been well developed and applied in the industry. The polymerization processes can be mentioned as followings, such as: cast film polymerization (JP-Kokoku-48 (1973)-42,466); polymerization conducted on conveyer belt (JP-Kokoku-58(1983)-49,714); polymerization conducted in kneader with stirring blades for comminuting (JP-Kokoku-57(1982)-34,101); reserve phase suspension polymerization (JP-Kokoku-59(1984)-37,003); or polymerization conducted by spraying or coating monomers on fiber matrix (JP-Kokoku-62(1987)-53,309).

However, the above-mentioned conventionally polymerization processes are basically directed to the radical polymerization of monomers, polymerization initiators and cross-linking agents to form SAP as gel-like solid, so that it is difficult to control the reaction of polymerization and thus, the soluble substances will be higher.

SUMMARY OF THE INVENTION

Therefore, the present invention provides a method of manufacturing super-absorbent polymer (SAP) which is powdery, insoluble in water, and able to absorb water, blood and urine with slight soluble substances. The polymerization process is relatively stable with moderate heat of reaction, and both operating environment and quality of products are improved.

The present invention of the method of manufacturing SAP includes at least the following steps: mixing an acidic monomer solution having at least 50 mol % of neutralized acrylic acid with polymerization initiators to synthesize (prepolymerize) a sticky precursor, wherein the acidic monomer can be selected from acrylic acid, methacrylic acid, 2-acrylamido-2-methylpropane sulfonic acid, or the mixtures thereof; mixing long chain polyatomic epoxy compounds and polymerization initiators with the precursor and producing a gel via UV cross-linking; drying the gel at temperature of 100 to 250° C. to obtain a polymer; grinding and screening said polymer into constant particle size; coating the polymer with surface cross-linking agents; heating the polymer at temperature of 80 to 230° C.; and adding powdery inert inorganic salts into the polymer.

In a preferred embodiment of the present invention of the method of manufacturing SAP, the viscosity of the sticky precursor is 10-10000 cP.

In another preferred embodiment of the present invention of the method of manufacturing SAP, the polymerization initiators are thermal decomposable initiators or redox initiators.

In another preferred embodiment of the present invention of the method of manufacturing SAP, the synthesis of the precursor is conducted in an upright reactor fitted with stirring blades or a drum container at temperature of 5-80° C. for 0.5-16 hours.

In another preferred embodiment of the present invention of the method of manufacturing SAP, the polymerization via UV cross-linking is completed in 10-300 seconds, particularly in 30-60 seconds.

In another preferred embodiment of the present invention of the method of manufacturing SAP, the long chain polyatomic epoxy compound comprises sorbitol polyglycidyl ether, polypropanetriol polyglycidyl ether, ethylene glycol diglycidyl ether, diethylene glycol diglycidyl ether, polyethylene glycol diglycidyl ether, and bispropanetriol polyglycidyl ether.

In another preferred embodiment of the present invention of the method of manufacturing SAP, the particle diameter of the screened gel is in the range of 0.05 to 1 mm.

In another preferred embodiment of the present invention of the method of manufacturing SAP, surface cross-linking agents are selected from polyatomic alcohols, polyethylene glycol diglycidyl eher, ethylene carboate or the mixtures thereof, and said surface cross-linking agents are added in the range of 0.005-5.0 wt %.

In another preferred embodiment of the present invention of the method of manufacturing SAP, wherein powdery inert inorganic salts are aluminum sulfate, aluminum oxide, magnesium oxide, calcium oxide, kaolin, silicon dioxide, calcium carbonate, magnesium carbonate, or the mixtures thereof, and said powdery inert inorganic slats are added in the range of 0.01-4.0 wt %.

By means of chemical reaction of synthesis of the precursor followed by polymerization via UV cross-linking, the present process is more stable with moderate heat of reaction in comparison with the conventional polymerization, and both operating environment and quality of products are improved.

The characteristics and practice of the present invention are fully described below in association with the accompanying drawings.

DETAILED DESCRIPTION OF THE INVENTION

The following embodiments are presented to describe the present invention in detail.

The present invention of a method of manufacturing superabsorbent polymer (SAP) which is powdery, insoluble in water, and able to absorb water, blood and urine with slight soluble substances includes at least the following steps: mixing an acidic monomer solution having at least 50 mol % of neutralized rate with polymerization initiators to synthesize a sticky precursor, wherein the acidic monomer can be selected from acrylic acid, methacrylic acid, 2-acrylamido-2-methylpropane sulfonic acid, or the mixtures thereof; mixing long chain polyatomic epoxy compounds and polymerization initiators with the precursor and producing a gel via UV cross-linking; drying the gel at temperature of 100 to 250° C. to obtain a polymer; grinding and screening said polymer into constant particle size; coating the polymer with surface cross-linking agents; heating the polymer at temperature of 80 to 230° C.; and adding powdery inert inorganic salts into the polymer.

The synthesis of the precursor may be conducted in a prepolymerization reactor that is capable to homogeneously mix materials for polymerization to conduct the synthesis. The prepolymerization reactor may be an upright reactor fitted with stirring blades as well as a lying drum container. The sticky precursor is then continuously transferred onto conveyer belt, and is photopolymerized by high intensity UV irradiation equipment installed above the belt into gel-like solid.

The acidic monomers necessary for manufacturing SAP in the present invention comprise, in addition to acrylic acid, other soluble monomers containing unsaturated double bond such as methacrylic acid, maleic acid, fumaric acid, 2-acrylamido-2-methylpropane sulfonic acid, etc. The monomer may be used individually or in combination of two or more thereof. Optionally, other hydrophilic monomers containing unsaturated double bond such as acrylamide, methacrylamide, 2-hydroxyethyl acrylate, 2-hydroxyethyl methacrylate, methyl acrylate, ethyl acrylate, dimethylamino propenyl acrylamide, and propenyl acrylamido trimethyl ammonium chloride, can be added, as long as the amount added does not adversely affect the properties of SAP.

The concentration of the monomer solution prior to radical polymerization is preferable in the range of 20 to 55 wt %, more preferable 30 to 45 wt %. When the concentration is below 20 wt %, the obtained sticky polymer is too soft, which is disadvantageous to mechanical working. Also when it is above 55 wt % near saturated concentration, it is difficult to formulate and the reaction proceeds too fast to control the generated heat of reaction.

The carboxylic acid group of the acidic monomer should be partially neutralized in order to control pH of the obtained products at neutral or weekly acidic. Neutralizers comprise lithium hydroxide, sodium hydroxide, potassium hydroxide, lithium carbonate, sodium carbonate, potassium carbonate, lithium bicarbonate, sodium bicarbonate, potassium bicarbonate, and ammonia. The carboxylic acid group of the acidic monomer can be partially neutralized into lithium, sodium, potassium, or ammonium salt, or the mixtures of two or more thereof. The neutralization concentration is preferable 45 to 85 mol %, more preferable 50 to 75 mol %. When the neutralization concentration is below 45 mol %, pH of the obtained products is too low. Also when it is above 85 mol %, pH of the obtained products is too high. In view of safety for operators, the neutralization concentration is preferably neutral or weekly acidic.

The synthesis of the precursor is initialized by decomposition of the polymerization initiators to produce radicals. Polymerization initiators comprise thermal decomposition initiators which are suitably selected from peroxides such as hydrogen peroxide, di-t-butyl peroxide, or amide peroxide, persulfates such as ammonium and alkali metal salts, and azo compounds such as 2,2'-diazobis(2-formamidinepropane) dihydrochloride and 2,2'-diazobis (N,N-dimethylene-isobutylamidine)dihydrochloride; and redox initiators which are suitably selected from sulfites, thiosulfates, ascorbates, and ferrites; or the combination of both types mentioned above. First, redox initiators are reacted to produce radicals that are transferred onto monomers to initiate polymerization. Since a large amount of heat of reaction is released as polymerization proceeds to elevate the temperature, when it is up to decomposition temperature of thermal decomposition initiator, a secondary decomposition starts and the polymerization is further promoted completely. Generally, the amount of radical polymerization initiators added is preferable 0.001 to 10 wt %, more preferable 0.1 to 5 wt %, based on the weight of acrylates neutralized. When the amount is below 0.001 wt %, the reaction proceeds too slow so that it is economically disadvantageous. Also, when it is above 10 wt %, the reaction proceeds too fast, so that heat of reaction is difficult to control and it is easily excessively polymerized to form gel-like solid.

Cross-linking agents should be added to sticky precursor prior to UV cross-linking. The cross-linking agents comprise compounds containing two or more unsaturated double bonds, such as: N,N-di(2-acryl)amine, N,N'-methylenebisacrylamide, N,N'-methylenebismethacrylamide, acryl acrylate, ethylene glycol diacrylate, polyethylene glycol diacrylate, ethylene glycol dimethacrylate, polyethylene glycol dimethacrylate, glycerol triacrylate, glycerol trimethacrylate, triacrylate or trimethacrylate of glycerol-ethylene oxide adduct, triacrylate or trimethacrylate of trimethylolpropane-ethylene oxide adduct, trimethylolpropane trimethacrylate, trimethylolpropane triacrylate, N,N,N-tri(2-acryl)amine, ethylene glycol diacrylate, triglycol diacrylate, etc. Also, compounds containing two or more epoxy compounds such as sorbitol polyglycidyl ether, polypropanetriol polyglycidyl ether, ethylene glycol diglycidyl ether, diethylene glycol diglycidyl ether, polyethylene glycol diglycidyl ether, and bispropanetriol polyglycidyl ether, etc., can be used. SAP is having proper cross-linking degree after radical polymerization, so that the obtained SAP gel is having proper working ability. The cross-linking agent for radical polymerization may be used individually or in combination of two or more thereof. The amount of cross-linking agents for radical polymerization added is preferable 0.001 to 5 wt %, more preferable 0.01 to 3 wt %, based on total solid weight in the reactants. When the amount is below 0.001 wt %, the obtained hydration polymer is too soft and viscous, which is disadvantageous to mechanical working. Also, when it is above 5 wt %, water-absorbing ability is decreased so that performance of the polymer is lowered.

The sticky precursor is synthesized in conveyer belt type reactor or horizontal reactor fitted with stirring blades, under high intensity UV irradiation, for 10-300 seconds, preferably 30-60 seconds. The obtained super-absorbent gel is ground by mill into diameter below 20 mm, preferably below 10 mm, and then is bake-dried.

The bake-drying temperature is preferable 100 to 250° C., more preferable 120 to 180° C. When the temperature is below 120° C., the drying time is too long so that it is economically disadvantageous. Also, when it is above 180° C., cross-linking agent is reacted earlier, so that remaining monomers can not be effectively removed in subsequent processes, since cross-linking degree is too high. Thus, the effect to decrease the remaining monomers can not be reached.

After dried, the polymer is ground and screened into constant particle size, and is coated with surface cross-linking agents. Particle diameter is preferable 0.06 to 1.00 mm, more preferable 0.10 to 0.85 mm. When the diameter is below 0.06 mm, dust content of the product is elevated. Also, when it is above 1.00 mm, water-absorbing rate of the product is lowered.

The surface cross-linking agents which are coated on the polymer after screened into constant particle size in the present invention comprise polyatomic alcohols such as propanetriol, ethylene glycol, diethylene glycol, triethylene glycol, polyethylene glycol, propylene glycol, 1,4-butylene glycol, trimethylolpropane, sorbitol, etc.; polyamines, such as: ethylenediamine, diethylenediamine, triethylenediamine, polyethylenediamine; compounds containing two or more epoxy such as sorbitol polyglycidyl ether, polypropanetriol polyglycidyl ether, ethylene glycol diglycidyl ether, diethylene glycol diglycidyl ether, polyethylene glycol diglycidyl ether, bispropanetriol polyglycidyl ether, etc.; and hydroxylalkylene carbonates such as ethylene glycol carbonate, 4-methyl-1,3-dioxolanyl-2-none, 5-dimethyl-1,3-dioxolanyl-2-none, 4,4-dimethyl-1,3-dioxolanyl-2-none, 4-ethyl-1, 3-dioxolanyl-2-none, 1,3-dioxnyl-2-none, 4,6-dimethyl-1,3-dioxanyl-2-none, and 1,3-dioxocycloheptanyl-2-none. The surface cross-linking agents may be used individually or in combination of two or more thereof. The amount of surface cross-linking agents added is preferable 0.001 to 10 wt %, more preferable 0.005 to 5 wt %, based on total solid weight in the reactants. When the amount of surface cross-linking agents is below 0.001 wt %, the effects are not achieved. Also, when it is above 10 wt %, water-absorbing ability is decreased so that performance of the polymer is lowered.

The surface cross-linking agents can be coated directly, or in the form of solution with water or hydrophilic organic solvents. Hydrophilic organic solvents comprise methanol, ethanol, propanol, isobutanol, acetone, methyl ether, and ethyl ether without limitation, as long as a solution can be formed. Methanol and ethanol are preferable. Powdery inert inorganic salts can be added into SAP during coating the surface cross-linking agents to promote dispersion of the solution. Powdery inert inorganic salts comprise aluminum sulfate, silicon dioxide, aluminum oxide, magnesium oxide, or the mixtures thereof, preferably aluminum sulfate and silicon dioxide. The amount of powdery inert inorganic salts added is preferable in the range of 0.005 to 10.0 wt %, more preferable 0.01 to 4.0 wt %.

The polymer is heated at temperature of 80 to 230° C. after coated with surface cross-linking agents, so that cross-linking reactions with both surface and internal cross-linking agents are conducted to achieve the effects of the present invention. When the temperature is below 80° C., the reaction time is too long so that it is economically disadvantageous. Also, when it is above or equal to 230° C., quality of polymer is readily lowered. As to reaction time, it is preferable 2-150 minutes depending on reaction temperature. Higher reaction temperature takes shorter reaction time.

SAP tends to aggregate into cakes after absorbing moisture. To prevent working ability is deteriorated as described above in high humidity areas, generally SAP are coated with inert inorganic powders or cross-linking agents on surface to be lipophilic. The inert inorganic powders comprise aluminum sulfate, silicon dioxide, aluminum oxide, magnesium oxide, calcium oxide, kaolin, calcium carbonate, magnesium carbonate, or the mixtures thereof. The amount of powdery inert inorganic salts added depends on particle size. The surface area of powdery inert inorganic salts is larger as particle size is smaller, so that the amount added is decreased. The amount of powdery inert inorganic salts added is preferable in the range of 0.005 to 10.0 wt %, more preferable 0.01 to 4.0 wt %. The particle diameter is 0.001 μm to 100 μm. When the particle diameter is below 0.001 μm, the production cost is increased that is disadvantageous to industrial production. Also, when it is above 100 μm, the added amount is too high so that the absorbing ability is adversely affected. Inert inorganic powders can be added individually, or in association with surfactants or viscous organic compounds which are selected from nonionic surfactants, aqueous anionic surfactants, cationic surfactants, or ampholytic surfactants with HLB (hydrophilic-lipophilic balance) above 12, or the mixtures thereof. Generally, surfactants or viscous organic compounds comprise glycerol, ethylene glycol, hexamethylene glycol, polyethylene oxide, polyethylene glycol, polyethylene glycol stearate, polyethylene glycol hexamethylene glycol stearate, polyoxyethenylene nonylphenyl ether, polyoxyethenylene octylphenyl ether, polyoxyethenylene dodecanylphenyl ether, polyoxyethenylene alkyl ether, and polyoxyethenylene lauryl ether. The surfactant or viscous organic compound can be added individually or in the form of aqueous solution. The amount of surfactants or viscous organic compounds added is preferable 0.001 to 5 wt %, more preferable 0.01 to 3 wt %, based on total solid weight in the reactants.

By means of synthesis (prepolymerization) of the precursor prior to whole polymerization in the present invention, the viscosity of the precursor in liquid materials is remarkably increased and the fluidity is reduced, so that the precursor is compatible in the belt type reactor phase, and the whole polymerization is more stable with moderate heat of reaction. The present method of manufacturing SAP improves both operating environment and quality of products, particularly remarkably decreases content of soluble substances.

In order to show the characteristic of slight soluble substances of SAP of the present invention, the content of soluble substances is measured as following steps: 0.5 g of SAP is weighted and added 185 g of 0.9% saline solution, then stirred at 500 rpm for 1 hour, and SAP extract is filtered out through filter paper. 20 g of the extract is weighted and titrated with 0.1

N NaOH, subsequently back titrated with 0.1 N HCl, and the content of soluble substances in SAP are obtained.

The following examples in detail are presented solely to illustrate but not limit the scope of the present invention.

EXAMPLE 1

1. 1760 g of acrylic acid and 2263.7 g of water were put into a 6000 ml-container purged with nitrogen; 1476.3 g of aqueous 45% NaOH was weighted separately and added slowly into the aqueous acrylic acid under ice cooling for neutralization; at this time a monomer solution of acrylic acid with concentration of 38.6 wt % was obtained, wherein 68 mol % of acrylic acid was neutralized as sodium acrylate.
2. The above neutralized monomer solution of acrylic acid was added to a horizontal drum prepolymerization reactor fitted with jacket along with 0.1 g of potassium persulfate: sodium bisulfate=1:1 by weight for mixing and prepolymerization; reaction temperature was 20° C. and reaction time was 60 minutes, the viscosity of the obtained precursor was 100 cP.
3. The sticky precursor, 1 g of azodiisobutyronitril, and 0.768 g of propanetriol ethylene glycol triglycidyl ether (n=7) were transferred onto conveyer belt simultaneously, the mixed liquid was irradiated by a high intensity UV irradiation equipment installed above the belt for 40 seconds (luminance=7.1 J/cm$^2$) to proceed cross-linking and transform into gel.
4. The gel was ground by mill into diameter below 2 mm.
5. It was dried at temperature of 130° C. for 2 hours; particles with diameter of 0.1-0.85 mm were screened out to obtain powdery SAP.
6. 10 g of the obtained SAP was weighted and added 0.1 g of aluminum sulfate powders, well-mixed, and added 0.4 g of ethylene glycol carbonate:water:methanol=1:1:1 by weight, then was heated at temperature of 215° C. for 10 minutes.
7. SAP was obtained after cooling. It was measured that holding capacity=29.2 g/g; magnification of absorbing water under pressure of 20 g/cm$^2$=29.5 g/g and under pressure of 49 g/cm$^2$=22.5 g/g; and content of soluble substances=5.1%.

EXAMPLES 2-4

1. These examples were carried out in the same manner as Example 1, excepting reaction time for prepolymerization were 180, 420 and 720 minutes, respectively, and the viscosity of the obtained precursors were 370, 1350 and 5000 cP, respectively.
2. It was measured that holding capacity were 32.3, 34.5 and 37.1 g/g, respectively; magnification of absorbing water under pressure of 20 g/cm$^2$ were 32.7, 31.5 and 28.7 g/g, respectively, and under pressure of 39 g/cm$^2$ were 24.1, 22.9 and 19.8 g/g, respectively; and content of soluble substances were 5.3%, 6.1% and 7.6%, respectively.

EXAMPLES 5-8

1. These examples were carried out in the same manner as Example 1, excepting reaction temperature for prepolymerization were 5, 15, 25, and 35° C., respectively; and the viscosity of the obtained precursors were 15, 80, 270, and 1050 cP, respectively.
2. It was measured that holding capacity were 27.1, 28.6, 31.7, and 33.4 g/g, respectively; magnification of absorbing water under pressure of 20 g/cm$^2$ were 27.3, 28.7, 30.9, and 31.5 g/g, respectively, and under pressure of 39 g/cm$^2$ were 18.2, 19.8, 22.8, and 23.6 g/g, respectively; and content of soluble substances were 2.5%, 3.4%, 5.2%, and 6.1%, respectively.

EXAMPLES 9-12

1. These examples were carried out in the same manner as Example 1, excepting polymerization initiators were a mixture of ammonium sulfate and sodium bisulfite (1:1 by weight), hydrogen peroxide, diisopropyl percarbonate, 2,2-azobis(2-formamidinepropane) dihydrochloride, respectively.
2. It was measured that holding capacity were 30.1, 29.7, 30.5, and 31.0 g/g, respectively; magnification of absorbing water under pressure of 20 g/cm$^2$ were 29.6, 30.0, 28.9, and 31.6 g/g, respectively, and under pressure of 39 g/cm$^2$ were 23.0, 22.5, 29.9, and 23.6 g/g, respectively; and content of soluble substances were 5.1%, 6.2%, 5.4%, and 5.7%, respectively.

EXAMPLES 13-15

1. These examples were carried out in the same manner as Example 1, excepting cross-linking agents were propanetriol polyethylene glycol triglycidyl ether (n=20), tripropenyl amine and ethylene glycol diacrylates, respectively.
2. It was measured that holding capacity were 33.2, 26.5 and 27.8 g/g, respectively; magnification of absorbing water under pressure of 20 g/cm$^2$ were 31.3, 27.9 and 28.7 g/g, respectively, and under pressure of 39 g/cm$^2$ were 24.9, 22.5 and 23.6 g/g, respectively; and content of soluble substances were 5.7%, 3.5% and 3.9%, respectively.

EXAMPLES 16-19

1. These examples were carried out in the same manner as Example 1, excepting irradiating time of UV irradiation equipment were 60, 30, 20, and 10 seconds, respectively; and luminance were 10.2, 5.1, 3.5, and 1.7 J/cm$^2$, respectively.
2. It was measured that holding capacity were 27.6, 29.6, 30.2, and 36.1 g/g, respectively; magnification of absorbing water under pressure of 20 g/cm$^2$ were 31.3, 32.5, 30.4, and 32.9 g/g, respectively, and under pressure of 39 g/cm$^2$ were 24.9, 26.3, 24.3, and 19.7 g/g, respectively; and content of soluble substances were 4.2%, 6.3%, 7.1%, and 8.1%, respectively.

In comparison with the comparative Examples 1 to 2, Examples 1 to 19 are given for showing their outstanding efficacy.

COMPARATIVE EXAMPLE 1

1. 1760 g of acrylic acid and 2263.7 g of water were put into a 6000 c.c. container purged with nitrogen; 1476.3 g of aqueous 45% NaOH was weighted separately and added slowly into the aqueous acrylic acid under ice cooling for neutralization; at this time a monomer solution of acrylic acid with concentration of 38.6 wt % was obtained, wherein 68 mol % of acrylic acid was neutralized as sodium acrylate.
2. The above neutralized monomer solution of acrylic acid was added 0.768 g of propanetriol polyethylene glycol triglycidyl ether (n=20), and the temperature was kept at 20° C. or so.

3. 1.9 g of hydrogen peroxide, 3.0 g of sodium persulfate, and 1.0 g of 2,2-azobis(2-formamidinepropane) dihydrochloride were added to initiate polymerization, and the resultant was left standing for 1 hour to form gel naturally.
4. The gel was ground by mill into diameter below 2 mm.
5. It was dried at temperature of 130° C. for 2 hours; particles with diameter of 0.1-0.85 mm were screened out to obtain powdery SAP.
6. 10 g of the obtained SAP was weighted and added 0.1 g of aluminum sulfate powders, well-mixed, and added 0.4 g of ethylene glycol carbonate:water:methanol=1:1:1 by weight, then was heated at temperature of 215° C. for 10 minutes.
7. SAP was obtained after cooling. It was measured that holding capacity=33.1 g/g; magnification of absorbing water under pressure of 20 g/cm$^2$=32.0 g/g and under pressure of 49 g/cm$^2$=22.1 g/g; and content of soluble substances=12.1%.

COMPARATIVE EXAMPLE 2

1. 1760 g of acrylic acid and 2263.7 g of water were put into a 6000 c.c. container purged with nitrogen; 1476.3 g of aqueous 45% NaOH was weighted separately and added slowly into the aqueous acrylic acid under ice cooling for neutralization; at this time a monomer solution of acrylic acid with concentration of 38.6 wt % was obtained, wherein 68 mol % of acrylic acid was neutralized as sodium acrylate.
2. The above neutralized monomer solution of acrylic acid was added 0.768 g of propanetriol polyethylene glycol triglycidyl ether (n=12), and the temperature was kept at 20° C. or so.
3. 1.9 g of hydrogen peroxide, 3.0 g of sodium persulfate, and 1.0 g of 2,2-azobis(2-formamidinepropane) dihydrochloride were added to initiate polymerization, and the resultant was left standing for 1 hour to form gel naturally.
4. The gel was ground by mill into diameter below 2 mm.
5. It was dried at temperature of 130° C. for 2 hours; particles with diameter of 0.1-0.85 mm were screened out to obtain powdery SAP.
6. 10 g of the obtained SAP was weighted and added 0.1 g of aluminum sulfate powders, well-mixed, and added 0.4 g of ethylene glycol carbonate:water:methanol=1:1:1 by weight, then was heated at temperature of 215° C. for 10 minutes.
7. SAP was obtained after cooling. It was measured that holding capacity=31.7 g/g; magnification of absorbing water under pressure of 20 g/cm$^2$=31.5 g/g and under pressure of 49 g/cm$^2$=24.7 g/g; and content of soluble substances=10.5%.

As described above, the disclosed method of manufacturing SAP which is powdery, insoluble in water, and able to absorb water, blood and urine with slight soluble substances comprises the following advantages:
1. The present method of manufacturing SAP improves both operating environment and quality of products, and it is confirmed through various experiments that the present invention is particularly effective on decreasing content of soluble substances.
2. By means of synthesis (prepolymerization) of the precursor prior to polymerization in the present invention, the viscosity of the precursor in liquid materials is remarkably increased and the fluidity is reduced, so that the precursor is compatible in the belt type reactor phase, and the whole polymerization is more stable with moderate heat of reaction.

Although the preferred embodiments of the present invention have been disclosed as above, the present invention is not limited thereto, those skilled in the art will appreciate that various changes and modifications are possible, without departing from the scope and spirit of the present invention as recited in the accompanying claims.

What is claimed is:
1. A method of manufacturing super-absorbent polymer (SAP) which is powdery, insoluble in water, and able to absorb water, blood and urine with slight soluble substances, the method includes at least the following steps:
   mixing an acidic monomer solution having at least 50 mol % of neutralized acrylic acid with polymerization initiators to synthesize a sticky precursor, wherein the acidic monomer is selected from the group consisting of acrylic acid, methacrylic acid, 2-acrylamido-2-methylpropane sulfonic acid, and any mixtures thereof, and
   the synthesis of the precursor is conducted at temperature of 5-80° C. for 0.5-16 hours;
   mixing long chain polyatomic epoxy compounds and polymerization initiators with the precursor and producing a gel via UV cross-linking;
   the polymerization via UV cross-linking is completed in 10-300 seconds;
   grinding and screening said polymer into constant particle size in a range of 0.05 to 1 mm;
   in response of the grinding and screening, drying the gel at temperature of 100 to 250° C. to obtain a polymer;
   coating the polymer with surface cross-linking agents;
   heating the polymer at temperature of 80 to 230° C.; and
   adding powdery inert inorganic salts into the polymer.
2. The method of manufacturing SAP as claimed in claim 1, wherein the viscosity of the sticky precursors is 10-10000 cP.
3. The method of manufacturing SAP as claimed in claim 1, wherein the polymerization initiators are thermal decomposable initiators or redox initiators.
4. The method of manufacturing SAP as claimed in claim 3, wherein the thermal decomposable initiators comprise hydrogen peroxide, di-t-butyl peroxide, amide peroxide, persulfates (ammonium and alkali metal salts), or azo initiators such as 2,2'-diazobis(2-formamidinepropane) dihydrochloride and 2,2'-diazobis(N,N-dimethyleneiso-butylamidine) dihydrochloride.
5. The method of manufacturing SAP as claimed in claim 3, wherein the redox initiators comprise acidic sulfites, thiosulfates, ascorbates, ferrite sulfates, or sulfates.
6. The method of manufacturing SAP as claimed in claim 1, wherein the synthesis of the precursor is conducted in an upright reactor fitted with stirring blades or a horizontal drum container.
7. The method of manufacturing SAP as claimed in claim 1, wherein the long chain polyatomic epoxy compounds comprise sorbitol polyglycidyl ether, polypropanetriol polyglycidyl ether, ethylene glycol diglycidyl ether, diethylene glycol diglycidyl ether, polyethylene glycol diglycidyl ether, and bispropanetriol polyglycidyl ether.
8. The method of manufacturing SAP as claimed in claim 1, wherein the surface cross-linking agents comprise polyatomic alcohols, polyethylene glycol diglycidyl ether, hydroxylalkylene carbonates, or the mixtures thereof.
9. The method of manufacturing SAP as claimed in claim 1, wherein the amount of surface cross-linking agents added is in the range of 0.005-5.0 wt %.

* * * * *